(12) United States Patent
Lee et al.

(10) Patent No.: US 8,308,336 B2
(45) Date of Patent: Nov. 13, 2012

(54) MULTI-SEGMENTED LIGHT GUIDE FOR KEYPAD AND DISPLAY APPARATUS

(75) Inventors: Sian Tatt Lee, Selangor (MY); Muh Fong Chung, Penang (MY); Choon Guan Ko, Penang (MY); Fook Chuin Ng, Penang (MY)

(73) Assignee: Intellectual Discovery Co., Ltd., Seoul (KR)

( * ) Notice: Subject to any disclaimer, the term of this patent is extended or adjusted under 35 U.S.C. 154(b) by 271 days.

(21) Appl. No.: 12/859,492

(22) Filed: Aug. 19, 2010

(65) Prior Publication Data

US 2012/0044716 A1 Feb. 23, 2012

(51) Int. Cl.
 *F21V 7/04* (2006.01)
(52) U.S. Cl. ........................................ 362/616; 362/618
(58) Field of Classification Search .................. 362/616, 362/618, 626
 See application file for complete search history.

(56) References Cited

U.S. PATENT DOCUMENTS

| | | | |
|---|---|---|---|
| 7,429,709 B2 | 9/2008 | Kim | |
| 7,534,001 B2* | 5/2009 | Liu | 362/24 |
| 2008/0117635 A1* | 5/2008 | Chen | 362/293 |
| 2008/0186736 A1 | 8/2008 | Rinko | |
| 2009/0003014 A1 | 1/2009 | Jablonski | |
| 2009/0045986 A1 | 2/2009 | Fabrenius et al. | |
| 2009/0129049 A1* | 5/2009 | Lee et al. | 362/24 |
| 2009/0262085 A1 | 10/2009 | Wassingbo | |
| 2009/0310355 A1* | 12/2009 | Chung et al. | 362/236 |

* cited by examiner

*Primary Examiner* — Evan Dzierzynski
(74) *Attorney, Agent, or Firm* — Fox Rothschild, LLP (57) ABSTRACT

A multi-segmented light guide for keypad and display apparatus has been disclosed. The light guide film may comprise a plurality of light segments configured to transmit light independently. The boundaries of the light segments may be defined by a plurality of micro-optic structures. The micro-optic structures may have a height at least half the thickness of the light guide.

21 Claims, 5 Drawing Sheets

MULTI-SEGMENTED LIGHT GUIDE FOR KEYPAD AND DISPLAY APPARATUS

BACKGROUND

Light guides are commonly used in Liquid Crystal Displays (referred to hereinafter as "LCDs"). Due to the constant demand for ever thinner displays with equal or better illumination uniformity, light guides have become thinner and more compact in recent years. Today, light guides are not only used in displays, but are also widely used in keypads. Light guides used in keypads may be elastic and typically thin, i.e., less than 0.4 mm in thickness. These very thin light guides are generally referred to as light guide films. The uniformity requirement for keypads may not be as high as those used in LCDs. While light guides used in LCDs tend to be rectangular, due to the complexity of keypad designs, light guide films used in keypads may appear in many different shapes or form factors. In some situations, a keypad may have multiple light guide films due to design requirements.

BRIEF DESCRIPTION OF THE DRAWINGS

Illustrative embodiments are described herein by way of example, not by way of limitation, and reference is made to the following drawings, in which the same or like reference numerals between figures may refer to the same or similar elements.

DETAILED DESCRIPTION

Figure 1:
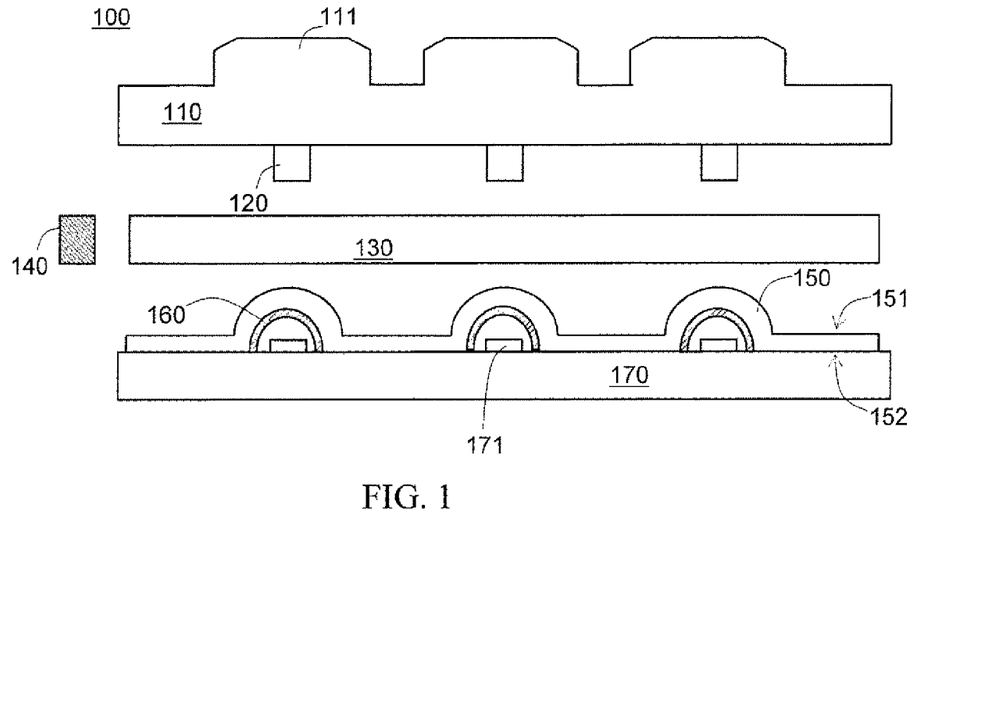
FIG. 1 illustrates a cross-sectional view of a side, backlit keypad.

FIG. 1 illustrates a cross-sectional view of a side, backlit keypad 100. Keypad 100 includes a key plate member 110, a light guide film 130, a light source 140, a reflective sheet 150, a plurality of metal domes 160, and a substrate 170. The key plate member 110 has a plurality of keys 111 formed thereon. A plurality of protrusions or plungers 120 may be disposed beneath the keys 111 respectively. In some alternative circumstances, the protrusion may not be beneath the key plate member 110, but located in a plunger layer (not shown) disposed beneath the light guide film 130. The substrate 170 may further comprise electrical contacts 171. The light source 140 may be a side emitting LED (referred to hereinafter as "LED") operable to emit light into the light guide film 130. The light source 140 may be attached to the substrate 170, or another piece of printed circuit board (referred herein after as "PCB"). The light guide film 130 may be disposed directly beneath the key plate member 110. In some alternative embodiments, optical layers (not shown) such as polarizing layers may be disposed between the light guide film 130 and the key plate member 110.

The keypad 100 may be a side, backlit type. The light source 140 may be illuminating into the plane of the light guide film 130 from the side before being transmitted through the light guide film 130 to illuminate the keys 111. The reflective sheet 150 may have a reflective upper surface 151 and an adhesive lower surface 152. The reflective sheet 150 may be disposed directly below the light guide film 130. In some circumstances, a plunger layer (not shown) discussed above or optical layers (not shown), such as optical diffuser sheets may be disposed between the reflective sheet 150 and the light guide film 130. The reflective sheet 150 may be configured to hold the metal domes 160 onto the substrate 170 by means of the adhesive lower surface 152. The metal domes 160 may be positioned over the corresponding electrical contacts 171 of the substrate 170.

Market demands for thinner and slimmer mobile devices appear to continue to drive the size of each layer thinner and thinner. For example, the overall thickness of the keypad 100 may typically be less than 1.1 mm. The key plate member 110 with the protrusions 120 may be approximately 0.4-0.7 mm. The reflective sheet 150 together with the metal domes 160 may be approximately 0.2-0.4 mm. The light guide film 130 may have a thickness of 0.2-0.4 mm. The substrate 170 may be approximately 0.2-0.4 mm.

When a key 111 is depressed, the depressive force is transferred by the protrusion or plunger 120 to compress a corresponding metal dome 160 through the light guide film 130. The action may eventually actuate the electrical contact 171. The light guide film 130 in the keypad 100 should contain sufficient elasticity to enable an individual key to be actuated by the user depressing the key 111. Some light guide films 130 may be sufficiently flexible, such that when a force applied to a specific key 209, the force may act to compress a specific metal dome 160 beneath the specific key without compressing any of the other neighboring metal domes 160.

Figure 2:
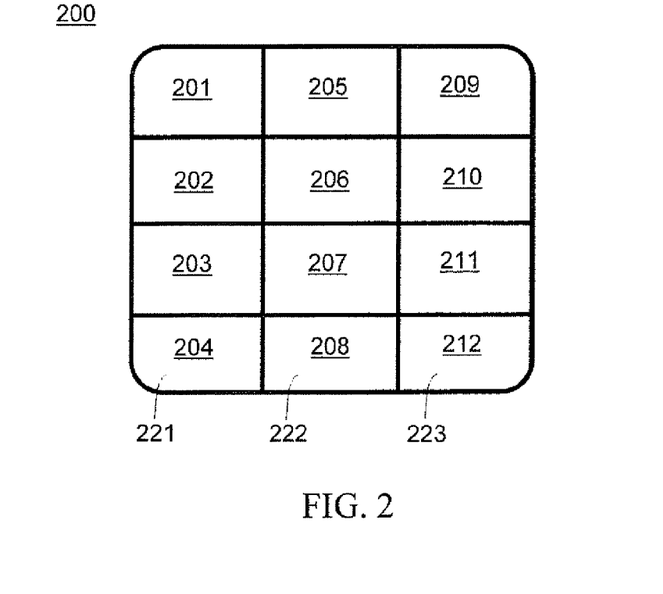
FIG. 2 illustrates an embodiment of a key plate having multiple light segments.

FIG. 2 illustrates an embodiment of a key plate member 200 as may be used in mobile devices. The key plate member 200 comprises a plurality of keys 201-212. For certain applications, the key plate member 200 may have an illumination scheme capable of being lit up, partially and independently. For example, the keys 201-212 in FIG. 2 may be further divided into a plurality of zones 221, 222 and 223. Zone 221 may comprise keys 201-204; zone 222 may comprise keys 205-208; and zone 223 may comprise keys 209-212. Each of the zones 221, 222 and 223 may be configured to light up independently. For example, at one instance, the keys 205-208 in zone 222 may be configured to be lit up while the keys 201-204 in zone 221, and the keys 209-212 in zone 223 may remain lit. Whereas at another instance, all keys 201-212 in all zones 221, 222 and 223 may be configured to light up simultaneously.

For such a configuration that requires multiple zones 221-223, one solution might include a different light guide film 130 (See FIG. 1) corresponding to each of the zone 221-223. A design comprising a convention single sheet of light guide film 130 (See FIG. 1) without any additional features may not meet the requirement of lighting up zones 221-223 individually or simultaneously, as the single light guide film 130 may transmit light to all the zones 221-223 simultaneously. The key plate member 200 shown in FIG. 2 may require three light guide films 130 (See FIG. 1), in order to have an illumination scheme capable of lighting up three separate zones 221-223, individually, as discussed above.

The embodiment shown in FIG. 2 may be one of the simplest numeric keypads. Keypads commercially produced today may be much more complicated, and having more complicated variations in lighting scheme than the key plate member 200 shown in FIG. 2. Due to the complexity of the illumination scheme and the more complex arrangement of the keys, having multiple light guides in one keypad may be very difficult. In addition, having many different light guides may not be economical from a manufacturing standpoint, as such an arrangement may involve additional alignment efforts and manufacturing steps.

Figure 3:
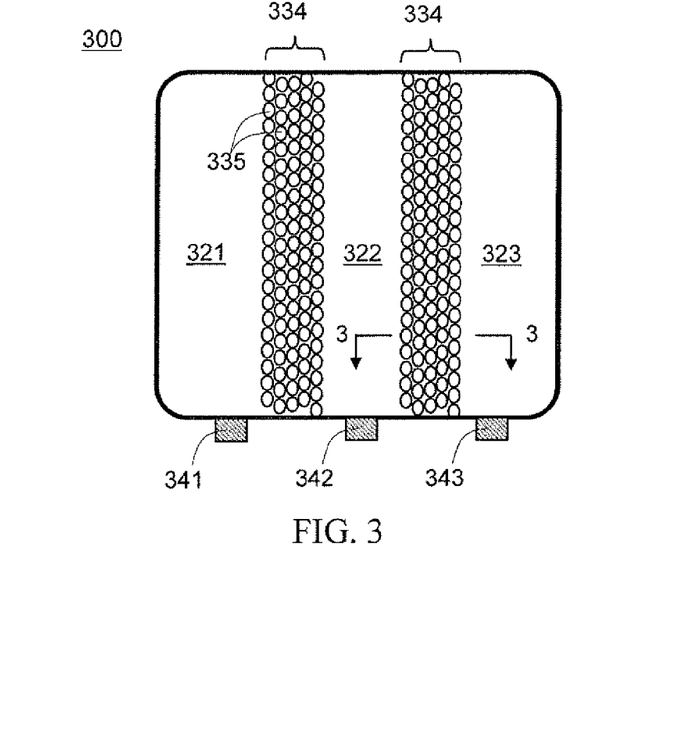
FIG. 3 illustrates an embodiment of a light guide film with multiple light segments corresponding to the key plate shown in FIG. 2.

The embodiment in FIG. 3 illustrates a light guide film 300 with multiple light segments 321-323 corresponding to the zones 221-223 in the key plate member 200 shown in FIG. 2. Light sources 341-343 may be coupled to each of the light segments 321-323, as shown in FIG. 3. The light guide film 300 may be made of any sufficiently transparent, flexible material, such as poly carbonate (referred to hereinafter as PC), poly urethane (referred to hereinafter as PU), poly ethylene (referred to hereinafter as PET), poly-methylmethacrylate (referred to hereinafter as PMMA), or a similar material.

The boundaries 334 of the light segments 321-323 may be defined by a plurality of micro-optic structures 335. The micro-optic structures 335 may be as small as several micrometers and may be fabricated with conventional micro-optics formation processes, such as hot press, roll-to-roll replication, or a similar method. The micro-optic structures 335 of the boundaries 334 may be configured to render each light segment 321-323 substantially separated, at least from an optical sense. For example, if completely separate optically, light transmitted within light segment 322 may not leak into light segments 321 and 323.

The optical separation may not be absolute for keypad applications. Each light segment 321-323 may not be independent optically in an absolute manner. That is, leakage or crosstalk from one segment 321-323 to another 321-323 may be permissible, but the light leakage may be significantly lower, for example, up to 40% brightness of the segment 321-323 which is configured to be illuminated in full brightness. The concept that absolute optical separation is acceptable may be explained considering the fact that the light from light guide film 300 may not be viewed directly by the user.

More specifically, in the embodiment shown in FIG. 3, each light segment 321-323 may be configured to transmit light within the boundaries 334 with low light leakage to the adjacent light segments 321-323. The light source 342 coupled to the light segment 322 may be configured to turn on such that the light segment 322 can be configured to transmit light to illuminate the keys 205-208. The other light sources 341 and 343 which coupled to the light segments 321 and 323 may remain off, such that the keys 201-204 and 209-212 are not illuminated.

However, due to the fact that optical separation may not be absolute, there may be low light leakage from the light segment 322 to the adjacent light segments 321 and 323. As a result, light segments 321 and 323 may have up to 40% brightness of the light segment 322, which may be configured to be illuminated by the light source 342 at full brightness. The light sources 341 and 343 may remain off.

The light leakage discussed above with respect to the embodiment shown in FIG. 3 may be acceptable for at least two reasons. First, the keypad 200 (see FIG. 2) is not an actual display. Thus, the design requirements may not be as stringent as light guides used in LCDs, which require a contrast of less than 10%. Second, the key plate member 200 shown in FIG. 2 may have color filters on the keys 201-212 which may be configured to reduce the effect of the leakage.

For example, referring to FIGS. 2 and 3, the light source 341-343 may be red, green and blue LEDs, respectively. As such, the keys 201-204 in zone 221 may comprise red color filter or material (not shown); the keys 205-208 in zone 222 may comprise green color filter or material (not shown); and the keys 209-212 in zone 223 may comprise blue color filter or material (not shown). When the light source 342 is configured to be on and the light sources 341 and 343 are configured to be off, the light may be coupled or leaked into the adjacent light segments 321 and 323. Thus, the green light emitted by the light source 342 may appear in the light segments 321 and 323.

The green light emitted by the light source 342 may be absorbed substantially by the red and blue color filters or material (not shown) in zones 221 and 223 respectively, while the green light in segment 322 may be configured to pass through the green filter or material (not shown) almost entirely in zone 222. As a result, the user may only effectively see less than 15% of the light leakage, even though the actual leakage may be as much as 40%.

Figure 4:
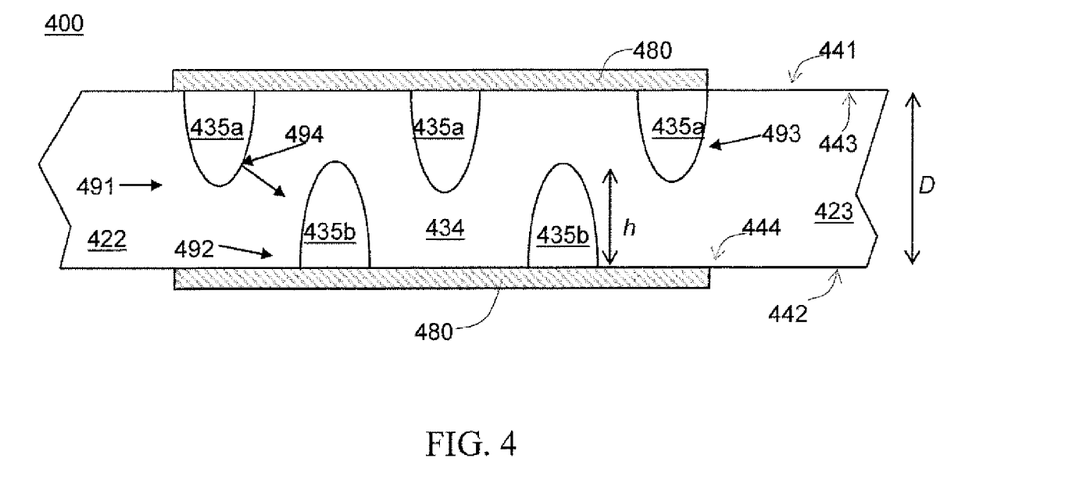
FIG. 4 illustrates a partial, cross-sectional view of a light guide film with spheroidal, micro-optic structures taken along section line 3-3 of FIG. 3.
Figure 7:
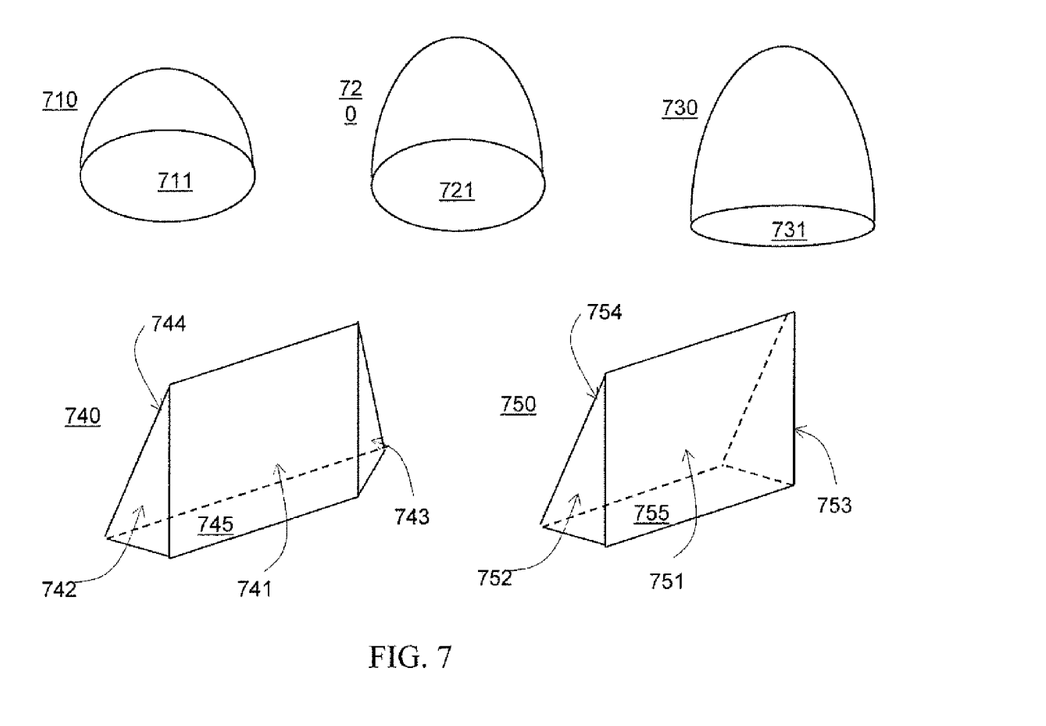
FIG. 7 illustrates an embodiment showing various shapes of micro-optic structures.

FIG. 4 illustrates a partial cross-sectional view of a light guide film 400 along section line 3-3 shown in FIG. 3. The embodiment in FIG. 4 illustrates how effective light separation between light segments 422 and 423 may be accomplished by the micro-optic structures 435a and 435b. In FIG. 4, the micro-optic structures 435a and 435b may form substantially spheroidal shapes. Other shapes may also be suitable. Some examples are shown in FIG. 7.

In the boundaries 434, the micro-optic structures 435a may be formed at a top inner surface 443 of the light guide film 400, whereas the micro-optic structures 435b may be formed at a bottom inner surface 444. As shown in the embodiment of FIG. 4, the micro-optic structures 435a located on the top inner surface 443 may be interdigitated with the micro-optic structures 435b located on the bottom inner surface 444.

Each of the micro-optic structures 435a and 435b may have a height h, which may relate to the thickness D, of the light guide film 400 in the following manner:

$$\tfrac{1}{2}D \leq h \leq D$$

In order to eliminate any direct light path between the adjacent light segments 422 and 423, the height h may be at least half the thickness D of the light guide film 400. The micro-optic structures 435a and 435b may not be the same size as the thickness D of the light guide film 400 due to concerns in reliability. Considering various aspects, such as reliability designs and process variations, the height h may be typically designed to be two third the thickness D of the light guide film 400.

Designing the height h to be more than half the thickness D of the light guide film 400 may eliminate the possibility of having a light path between the adjacent light segments 422 and 423 due to process variation. Even if light, for example ray 491, is being illuminated parallel to the planar of the light guide film 400, the light may be either reflected due to total internal reflection by one of the micro-optic structures 435a located at the top inner surface 443 or the micro-optic structures 435b located at the bottom inner surface 444.

With this configuration, light emitted towards the boundaries 434 at the top portion, such as ray 493, may be reflected by the micro-optic structures 435a located at the top inner surface 443 whereas light emitted at the bottom portion, such as ray 492, may be reflected by the micro-optic structures 435*b* located at the bottom inner surface 444. Light may also be reflected back to each of the light segments 422-423 through multiple reflections.

The substantially spheroidal shape of the micro-optic structures 435*a* and 435*b* may improve optical separation between the two light segments 422 and 423. For example, light being reflected back towards the light segment 422, such as ray 494 may be blocked when ray 494 hit the micro-optic structure 435*a* as shown in FIG. 4. But instead, due to the curvature of the spheroid shape, ray 494 may be reflected towards a micro-optic structure 435*b* located at the bottom inner surface 444 and subsequently back to the light segment 422.

An opaque material 480 may be formed at the top surface 441 above the boundaries 434. The opaque material 480 may comprise black ink, black paint, or other similar opaque material attachable to the top surface 441 of the light guide film 400. The opaque material 480 may serve two functions. First, the opaque material 480 may be configured to prevent light from the boundaries 434 to illuminate into the keys 111 (See FIG. 1) above the light guide film 400. Secondly, the opaque material 480 may also be configured to absorb light in the boundaries 434 in order to reduce leakage from one light segment 422 to another light segment 423.

As shown in FIG. 4, the opaque material 480 may also be formed at the bottom surface 442 below the corresponding boundaries 434. The opaque material 480 at the bottom surface 442 may be configured to reduce leakage which may happen due to light reflection. The opaque to material 480 may prevent light in the boundaries 434 from being emitted to the reflective sheet 150 (See FIG. 1). Consequently, this may also prevent the light from being reflected further by the reflective sheet 150 (See FIG. 1) towards the adjacent light segment 423. In another embodiment, the micro-optic structures 435*a*-435*b* may define depressions at the top surface 441 and the bottom surface 442. Therefore, the opaque material 480 may filled up the depressions and further enhance light separation by absorbing light which may be leaked into the micro-optic structures.

In some circumstances, the opaque material 480 may be white ink, white paint, or other similar material. An opaque material of a white paint may be able to prevent light from illuminating into the key plate 110 and the reflective sheet 150 (See FIG. 1). However, light falling on the top inner surface 443 or bottom inner surface 444 may not be absorbed and thus, leakage from one light segment 422 to the adjacent light segment 423 through within the boundaries 434 may not be reduced.

Figure 5:
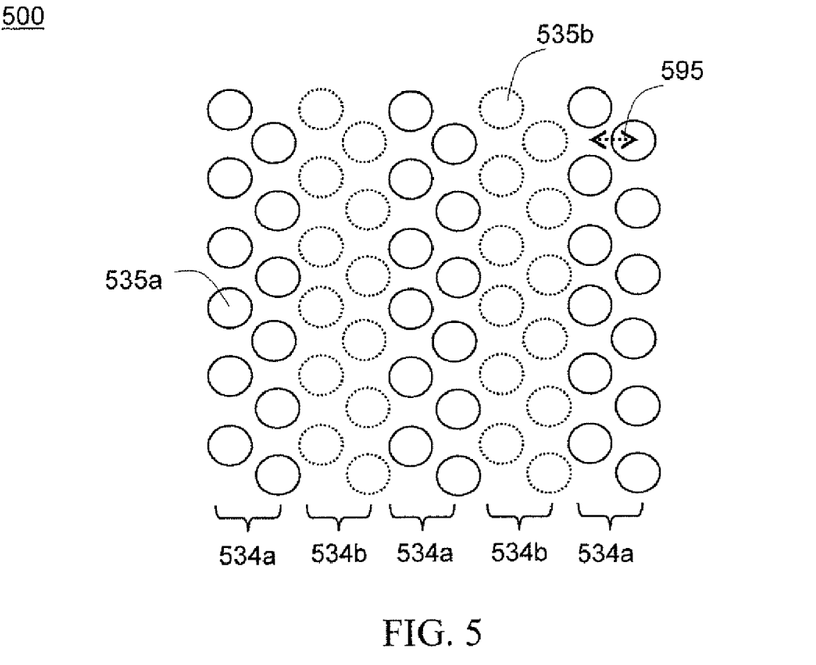
FIG. 5 illustrates an embodiment of an arrangement for micro-optic structures with two rows of micro-optic structures as basic formation.

In order to establish optical separation between two adjacent light segments 421-423, basically the micro-optic structures 435*a* and 435*b* need to be arranged into two groups. One group of micro-optic structures 435*a* are positioned at the top inner surface 443, and this group of micro-optic structures 435*a* may be interdigitated with another group of the micro-optic structures 435*b* positioned at the bottom inner surface 444 as shown in FIG. 4. However, the arrangement of each of the micro-optic structures 435*a* and 435*b* should not be in a systematic rectangular m×n matrix form, for example, by a fixed number of rows and columns. Exemplary embodiments of the arrangement for the micro-optic structures 435*a* and 435*b* are shown in FIGS. 5 and 6.

One possible arrangement of the micro-optic structures 435*a* and 435*b* may be having a fundamental building block, and then replicates the building block across the boundaries 434 (see FIG. 4) at both the top and bottom inner surfaces 443-444. For example, FIG. 5 illustrates an embodiment of an arrangement 500 of the micro-optic structures 535*a* and 535*b* having a fundamental building block or a basic formation 534*a* and 534*b*. The basic formation 534*a* may be similar to the basic formation 534*b* but located at different inner surfaces. The basic formation 534*a* located at the top inner surface 443 (see FIG. 4) comprises two rows of the micro-optic structures 535*a*. The micro-optic structures 535*a* in the basic formation 534*a* may not be in a systematic rectangular m×n matrix form. On the contrary, the two rows of the micro-optic structures 535*a* may be positioned in an interspersed manner in which each of the micro-optic structures 535*a* may be positioned at the middle of corresponding two micro-optic structures 535*a* in the adjacent row. An example is illustrated by line 595 in FIG. 5.

Similarly, the basic formation 534*b* located at the bottom inner surface 444 (See FIG. 4) comprises two rows of the micro-optic structures 535*b* with identical arrangement. As shown in FIG. 5, each basic formation 534*a* located at the top inner surface 443 (See FIG. 4) is interdigitated with the basic formation 534*b* located at the bottom inner surface 444 (See FIG. 4). The basic formation 534*a* and 534*b* may not be limited to two rows of the micro-optic structures 535*a* and 535*b*. The basic formation 534*a* and 535*b* may comprise more than two rows of the micro-optic structures 535*a* and 535*b*.

Figure 6:
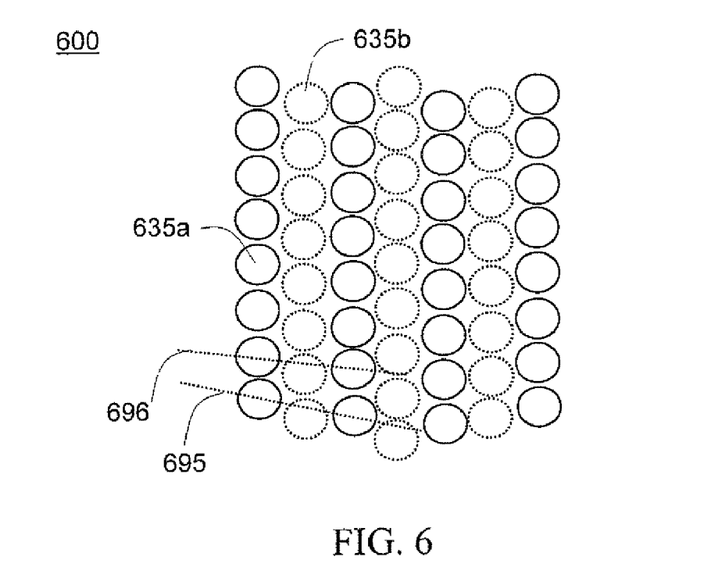
FIG. 6 illustrates an embodiment of an arrangement for micro-optic structures with one row of micro-optic structures located at top inner surface being interdigitated with another row located at bottom inner surface.

FIG. 6 shows an embodiment illustrating another arrangement 600 of the micro-optic structures 635*a* and 635*b*. In FIG. 6, one row of micro-optic structures 635*a* located at the top inner surface 443 (See FIG. 4) being interdigitated with another row of micro-optic structures 635*b* located at the bottom inner surface 444 (See FIG. 4). Disregarding the micro-optics structures 635*b* and only consider all the micro-optic structures 635*a* located on the same top inner surface 443 (See FIG. 4), all the micro-optic structures 635*a* combined may form rows, but may not be arranged in a systematic rectangular m×n matrix form. Similar conclusions can be drawn when considering only all of the micro-optic structures 635*b* located at the bottom inner surface 444 (See FIG. 4), or when considering all the micro-optic structures 635*a* and 635*b* combined.

The spacing between each of the micro-optic structures 635*a* and 635*b* may not be consistent. Each of the micro-optic structures 635*a* may be to slightly dislocated differently from the corresponding micro-optic structures 635*a* in adjacent row as illustrated by lines 695 and 696. Although all the micro-optic structures 635*a* may appear to be arranged in rows, each row may not be identical. Unlike the arrangement 500 shown in FIG. 5, the arrangement 600 shown in FIG. 6 may not comprise one identical basic formation formed at one of the top 443 or bottom inner surfaces 444 (see FIG. 4).

FIG. 7 illustrates an embodiment showing various shapes of the micro-optic structures 435*a* and 435*b* shown in FIG. 4. The micro-optic structures 435*a* and 435*b* can be a spheroid 710 with a round base 711, a prolate spheroid or a stretched spheroid 720 with round base 721, or an ellipsoid 730 with an ellipse base 731. The embodiment shown in FIG. 7 is not exhaustive and other shapes such as cube shape may be applicable. Due to process variation and various aspect of manufacturing accuracy, the actual shape may not be exactly the same shape as a spheroid 710, prolate spheroid 720, or a ellipsoid 730 but the micro-optic structures 435*a* and 435*b* may be substantially similar to the shapes mentioned above.

Moreover, micro-optics with sharp angle surfaces such as a pentahedron 740 shown in FIG. 7 may be utilized. The base surface 745 of the pentahedron 740 may be a trapezoid. The base surface 745 may be parallel to the planar of the light guide film 400 such that the pentahedron shape may be formed at the top inner surface 443 or the bottom inner surface 444 of the light guide film 400 shown in FIG. 4.

The pentahedron 740 may comprise a first surface 741, a second surface 742 and a third surface 743 positioned substantially perpendicular to the base surface 745. The fourth surface 744 may form an acute angle with the base surface 745 and the first surface 741, respectively, such that the fourth surface 744, the base surface 745 and the first surface 741 may abut each other to form a right triangle. The first surface 741, may form an angle more than 90 degree with the second and third surfaces 742-743, respectively, such that the base 741 is a trapezoid.

The prism shape 750 may be similar to the pentahedron except that the second surface 752 and the third surface 753 may be in parallel. The base surface 755, the first surface 751 and the fourth surface 754 may be rectangular shape abutting each other to form a right triangle. Due to the manufacturing process, the actual shape may not be exactly a pentahedron 740 or a prism 750, but substantially similar to a prism 740 or a pentahedron shape 740, as shown in FIG. 7.

Figure 8:
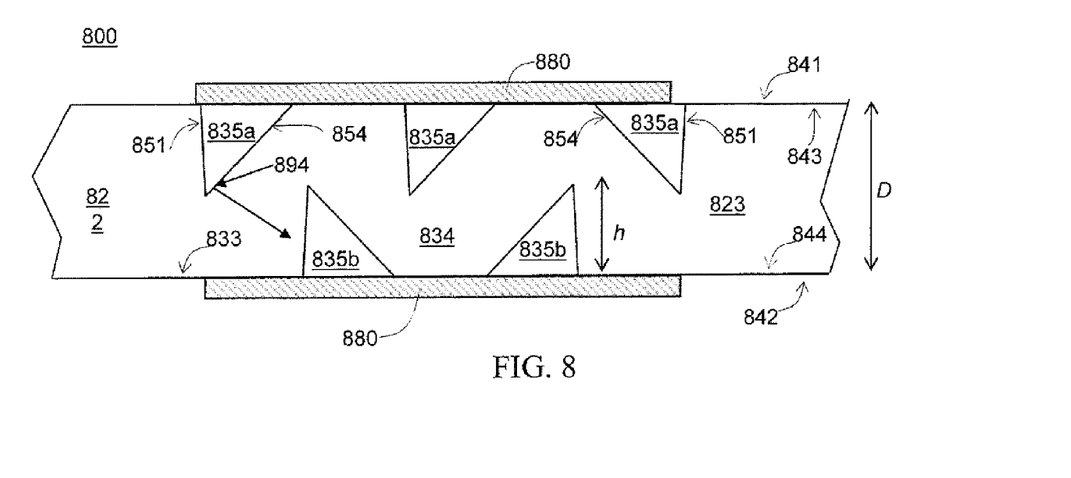
FIG. 8 illustrates a partial, cross-sectional view of a light guide film with pentahedron micro-optic structures taken along section line 3-3 of FIG. 3; and, FIG. 9 illustrates an embodiment of a display with multiple display areas.

FIG. 8 illustrates a partial cross-sectional view of a light guide film 800. The light guide film 800 is similar to the light guide film 400 shown in FIG. 4, except that the micro-optic structures 835a and 835b are prism 750 shapes shown in FIG. 7. Similar to the light guide film 400, the micro-optic structures 835a may be positioned at the top inner surface 843, whereas the micro-optic structures 835b may be positioned at the bottom inner surface 844. A portion of the top surface 841 and the bottom surface 842 corresponding to the boundaries 834 may be covered by an opaque material 880. The height, h of the micro-optic structures 835a and 835b may be more than half of the thickness, D of the light guide film 800.

Typically, the first surface 851, which is substantially perpendicular to the planar of the light guide film 800, may be configured to face the light segments 822 or 823. This configuration may improve optical separation between two light segments 822 and 823. For example ray 894, which is reflected back towards the light segment 822 from a micro-optic structure 835a located at the top inner surface 843, may not be blocked. Instead, ray 894 may be reflected towards a micro-optic structure 835b located at the bottom inner surface 844 and subsequently back to the light segment 822.

Figure 9:
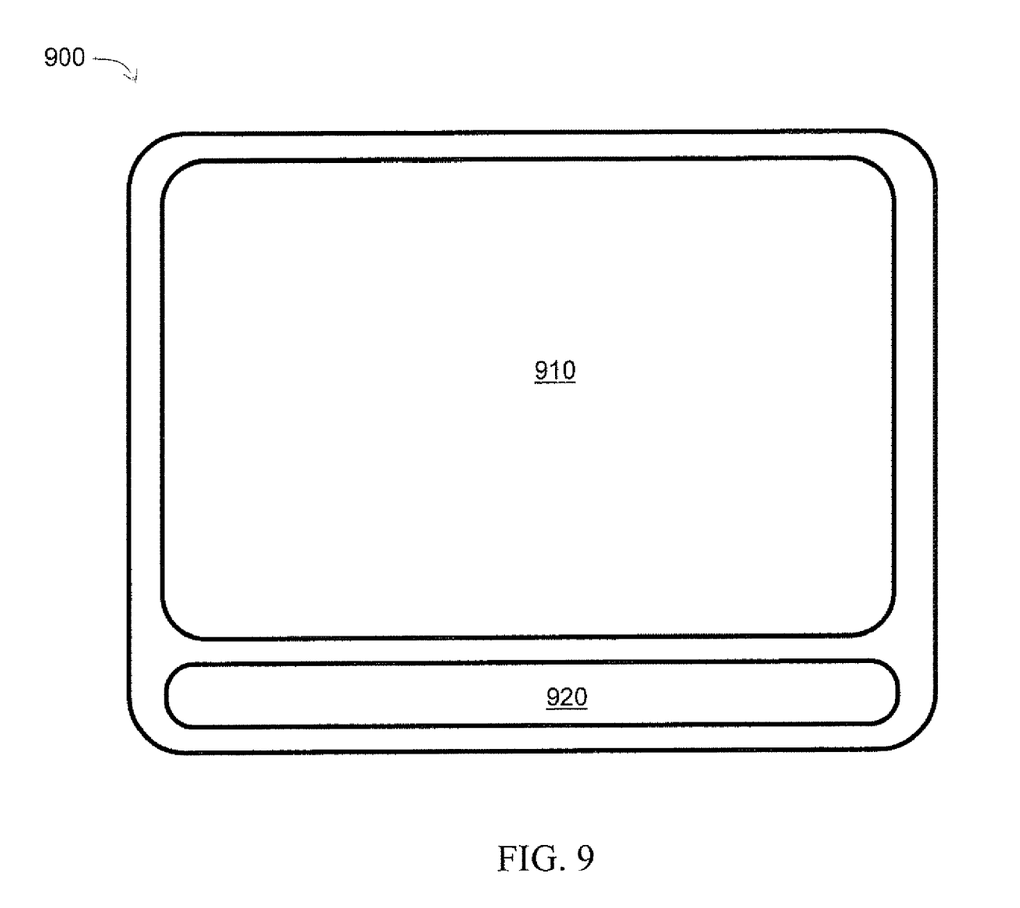

A light guide with multiple segments such as the light guide film 800 shown in FIG. 8 and the light guide film 400 shown in FIG. 4 may not be limited to keypad illumination applications, but may also be used in other areas such as an LCD. FIG. 9 illustrates an embodiment of a display 900 with multiple display areas. The display 900 comprises a first display area 910 which may be configured to show graphics or video, and a second display area 920 which may be configured to exclusively display text. The specification for display may be more stringent in terms of light leakage between two adjacent display areas. However, fundamentally, the light guide 800 may function in a similar manner to the light guides used in keypads.

Although specific embodiments of the invention have been described and illustrated herein above, the invention is not to be limited to the specific forms or arrangements of parts so described and illustrated. The scope of the invention is to be defined by the claims appended hereto and their equivalents.

What is claimed is:

1. A light guide film for use in a keypad comprising:
    a substrate;
    a reflective sheet;
    a plurality of light sources;
    a key plate member having a plurality of keys;
    a plurality of light segments in the light guide film, wherein each of the light segments is configured to transmit light independently to the corresponding keys of the key plate member located above the light guide film, and wherein the plurality of light sources operable to emit light independently into the corresponding light segments; and
    a plurality of micro-optic structures located within the light guide film, wherein the micro-optic structures are arranged to define boundaries of the light segments of the light guide film, and wherein each of the micro-optic structures has a height at least half the thickness of the light guide film.

2. The light guide film of claim 1, wherein the micro-optic structures form a substantially spheroid shape.

3. The light guide film of claim 1, wherein the micro-optic structures form a pentahedron shape, the pentahedron comprising:
    a first, second and third surfaces, the first, second and third surfaces being positioned substantially perpendicular to the planar of the light guide film;
    a base surface positioned parallel to the planar of the light guide film; and,
    a fourth surface, wherein the fourth surface, the first surface and the base surface form a right triangle.

4. The light guide film of claim 1, wherein the micro-optic structures are formed using hot press method.

5. The light guide film of claim 1, wherein the height of the micro-optic structures is substantially two third the thickness of the light guide film.

6. The light guide film of claim 1, wherein the light guide film has a top surface and a bottom surface; wherein a portion of the top and bottom surfaces of the light guide film located corresponding to the boundaries of the light segments are coated with an opaque material.

7. The light guide film of claim 6, wherein the opaque material is configured to absorb light.

8. The light guide film of claim 1, wherein the light guide film has a top inner surface and a bottom inner surface; wherein the micro-optic structures are positioned such that a group of the micro-optic structures located on the top inner surface of the light guide film are interdigitated with another group of the micro-optic structures located on the bottom inner surface of the light guide film.

9. The light guide film of claim 1, wherein the light guide film has a top inner surface and a bottom inner surface, and wherein the micro-optic structures are grouped into a plurality of basic, formations, the basic formation comprises at least two rows of the micro-optic structures arranged in an interspersed manner, and each basic formation located on the top inner surface is interdigitated with a corresponding basic formation located on the bottom inner surface.

10. The light guide film of claim 1, wherein the light guide film has a top inner surface and a bottom inner surface; wherein the micro-optic structures are arranged in a plurality of rows such that each row located on the top inner surface is interdigitated with a corresponding row located on the bottom inner surface.

11. The light guide film of claim 1, wherein the light guide film is flexible.

12. A keypad having a plurality of light segments operable to light up independently, the keypad comprising:
    a substrate;
    a reflective sheet disposed on the substrate;
    a light guide film disposed directly or indirectly on the reflective sheet, wherein the light guide film further comprises a plurality of micro-optic structures arranged in a manner to define boundaries of the light segments, and wherein each of the micro-optic structures has a height at least half the thickness of the light guide film;

a plurality of light sources coupled corresponding to each light segment of the light guide film, the plurality of light sources operable to emit light independently into the corresponding light segments; and, a key plate member disposed on the light guide film.

13. The keypad of claim 12, wherein the micro-optic structures forms a substantially spheroid shape.

14. The keypad of claim 12, wherein the height of the micro-optic structures is substantially two third the thickness of the light guide film.

15. The keypad of claim 12, wherein the light guide film has a top surface and a bottom surface, a portion of the top and bottom surfaces of the light guide film located corresponding to the boundaries are coated with an opaque material.

16. The keypad of claim 15, wherein the opaque material comprises a dark material configured to absorb light.

17. The keypad of claim 12, wherein the light guide film has a top inner surface and a bottom inner surface; the micro-optic structures are positioned such that a group of the micro-optic structures located on the top inner surface of the light guide film are interdigitated with another group of the micro-optic structures located on the bottom inner surface of the light guide film.

18. The keypad of claim 12, wherein the light guide film has a top inner surface and a bottom inner surface, and wherein the micro-optic structures are grouped into a plurality of basic formations, the basic formation comprises at least two rows of the micro-optic structures arranged in interspersed manner, and every basic formation located on the top inner surface is interdigitated with another basic formation located on the bottom inner surface.

19. The keypad of claim 12, wherein the light guide film has a top inner surface and a bottom inner surface; the micro-optic structures are arranged in multiple rows such that every row located on the top inner surface is interdigitated with another row located on the bottom inner surface.

20. The keypad of claim 12, wherein the keypad forms a portion of a mobile device.

21. A light guide film, for use in a display having at least two display areas and a plurality of light sources, the light guide film comprising:

a plurality of light segments positioned corresponding to the display area, wherein each of the light segments is configured to transmit light independently to the corresponding display segment of the display, and wherein the plurality of light sources is operable to emit light independently into the corresponding light segments; and, a plurality of micro-optic structures located within the light guide film, wherein the micro-optic structures are arranged to further define boundaries of the light segments of the light guide film, and wherein each of the micro-optic structures has a height at least half the thickness of the light guide film.

* * * * *